Feb. 9, 1937.  W. H. LAWS, SR  2,069,888
HORSESHOE
Filed April 18, 1935

INVENTOR
Walter H. Laws sr.
BY
ATTORNEY

Patented Feb. 9, 1937

2,069,888

UNITED STATES PATENT OFFICE 2,069,888

HORSESHOE

Walter H. Laws, Sr., Hamilton, Ontario, Canada

Application April 18, 1935, Serial No. 16,940

2 Claims. (Cl. 168—13)

This invention relates to cushioned horseshoes which comprise a metallic core enclosed or partially enclosed by a rubber casing and has for its object the construction of a cushioned horseshoe the width of which is adjustable.

Heretofore the metallic core of such shoes has been made in one piece and for this reason it is extremely difficult to fit a shoe so constructed to a horse's hoof so that it will correctly fit. In shoeing horses, it is extremely important that the shoe fit correctly, otherwise serious injury to the hoof may result. To adjust the type of core heretofore used to fit the hoof, it was necessary to increase or decrease the width of the shoe by hammering the core to increase or decrease the distance between the two sides according to the specific requirements to make the shoe fit. This operation has to be done with the core cold since heat would destroy the rubber cushion which surrounds the core. It will be apparent that only a very small adjustment may be made in this manner. As a result it has been necessary to manufacture a large number of sizes of shoes, each size requiring a specific size of core and a specific size of mould for moulding the rubber cushion to the core. This necessarily makes the manufacture of rubber cushioned horseshoes expensive.

The object of my invention is to so construct the core of the horseshoe that it can be easily adjusted to fit the horse's hoof correctly. By employing my invention in the manufacture of rubber cushioned horseshoes, it is also possible to lessen the number of different sizes since one size may be adjusted to several different sizes of hoofs. By means of my invention, I am therefore able to substantially lessen the cost of manufacturing rubber cushioned horseshoes by reason of the fact that I am able to dispense with the number of moulds required.

The manner in which I accomplish these and other objects of my invention is set forth in the following description of my invention wherein I describe a preferred embodiment of my invention and have illustrated the same in the accompanying drawing in which:—

Figure 1:
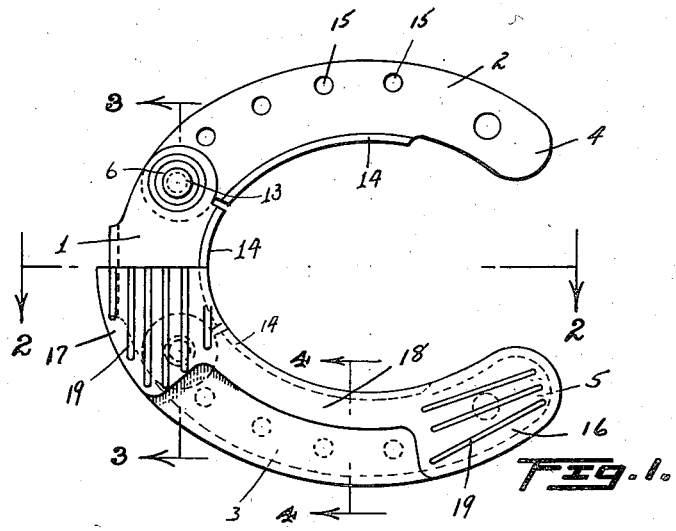

Fig. 1 is a plan view of a horseshoe constructed in accordance with my invention and from which the rubber padding has been partly removed to show the details of the metallic core.

Figure 2:
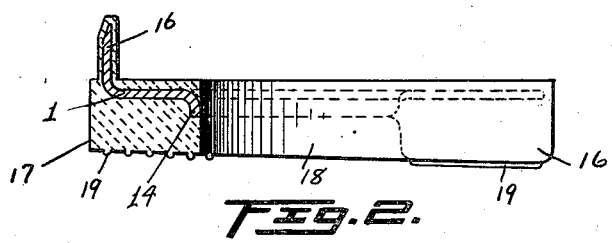
Figure 3:
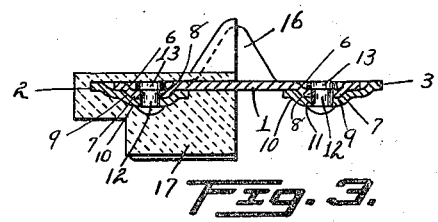
Figure 4:
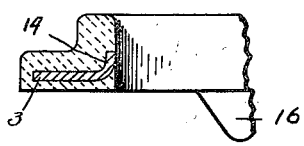

Fig. 2 is a sectional view on the line 2—2 Fig. 1.
Fig. 3 is a sectional view on the line 3—3 Fig. 1.
Fig. 4 is a sectional view on the line 4—4 Fig. 1.

Like characters of reference refer to like parts throughout the specification and drawing.

The shoe illustrated in the drawing consists of a shoe-shaped metallic core which is formed in a plurality of sections namely, a toe piece 1 and side pieces 2, 3, terminating in heels 4, 5 respectively. The side pieces are united to the toe piece in the following manner; each end of the toe piece has formed in its top side a spherical shaped depression 6, resulting a spherical shaped boss 7 on the opposite side thereof. A bore 8 is also formed through the centre of the depression. The end of the side pieces which will abut against the toe piece is formed with a corresponding depression 9, boss 10 and bore 11, the depression 9 being shaped to receive the boss 7 with a snug fit. These spherical shaped depressions and spherical shaped bosses provide a means for anchoring the elastic casing in which the metallic core is encased. The toe and side pieces are permanently united by means of rivets 12 which are passed through the bores 8, 10, the rivets being secured in place by hammering it to form a head 13. The rivets also serve as a pivot upon which the side pieces turn when they are moved laterally as required during fitting. It is preferable to unite the toe and sides with a tight fit in order that a certain amount of pressure will be required to spread the side pieces apart or towards each other during the fit of the shoe to a hoof.

The toe and side pieces are provided or formed with a flange 14 projecting downwardly from the inner edge thereof and extending from a point near the heel of one of the side pieces around the inner edge to a corresponding point near the other heel of the other side piece. While the depth of this flange may vary depending on the thickness of the rubber calks used, it has been found that about ¼ of an inch is very satisfactory. The flange may be welded in place or it may be part of the inner edge bent downwardly.

The nails necessary to retain the shoe upon the hoof pass through the holes 15 which are formed in the side pieces. The toe piece of the core is also provided or formed with an upwardly extending piece 16a formed, in the construction shown, by upwardly bending a portion of the outer rim at the centre of the toe piece. This latter piece 16a is for the purpose of supplying added reinforcement to prevent the shoe separating from the hoof. The core is totally enclosed in rubber or other elastic material moulded completely around it and consisting generally of a pad or tread extending downwardly from the underneath part of the core from heel to heel except for the sections wherein lie the nail holes 15 which part of the core is only thinly coated.

The complete pad is made up of heel calks 16, toe calk 17 and ribs or treads 18, connecting each of the heel calks to the toe calk, the treads 18 being brought down flush with the surface of the toe and heel calks which contact the ground, thus providing a support between these two members, so that the weight of the horse will be evenly distributed over the entire surface of the shoe and thus avoiding any unsupported points of strain. The under surface of the rubber pad is provided with anti-skid treads 19. The top or upper surface of the core, which contacts the hoof, has, of course only a thin coating of rubber.

The flange 14 serves a dual purpose; Firstly, it is of value when the shoe is being fitted to a hoof as it provides a striking surface when spreading the sides apart and by means of which the shoe can be properly fitted to the hoof; secondly, the flange is of further advantage in providing a reinforcement for the core and prevents the rubber from being torn from place when under excessive strain. The strains set up on the tread of the shoe when starting or holding back a heavy load are partly carried by the bosses 10, which also serve as a reinforcement for the toe piece and also prevent the rubber from being loosened or torn away under these strains.

It will be seen from the description heretofore given that a horseshoe constructed in accordance with this invention can be readily adjusted to the proper size required to fit the horse's hoof correctly.

What I claim as new and desire to secure by Letters Patent, is:

1. A cushioned horseshoe comprising a flat metallic horseshoe-shaped core having toe and side pieces, the side pieces being pivotally connected at the toe piece for lateral adjustment, a downwardly extending flange formed along the inner edge of said toe and side pieces, an elastic casing encasing said core and forming a toe caulk, heel caulks and a rib joining each heel caulk to the toe caulk, and means for anchoring the elastic casing comprising a spherical shaped depression in the upper side of the toe piece at each end thereof and a spherical shaped stud on the underside of the side pieces immediately underlying the ends of the toe pieces.

2. A cushioned horseshoe comprising a flat metallic horseshoe-shaped core having toe and side pieces, the side pieces being pivotally connected at the toe piece for lateral adjustment, a downwardly extending flange formed along the inner edge of said toe and side pieces, an elastic casing encasing said core and forming a toe caulk, heel caulks and a rib joining each heel caulk to the toe caulk, and means for anchoring the elastic casing comprising an indentation in the upper side of the toe piece at each end thereof and a stud on the under side of said pieces immediately underlying the end of the toe pieces.

WALTER H. LAWS, Sr.